United States Patent
Onuma (10) Patent No.: US 12,244,776 B2
(45) Date of Patent: *Mar. 4, 2025

(54) IMAGE READING DEVICE AND IMAGE READING METHOD

(71) Applicant: TOSHIBA TEC KABUSHIKI KAISHA, Tokyo (JP)

(72) Inventor: Satoshi Onuma, Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 125 days.

This patent is subject to a terminal disclaimer.

(21) Appl. No.: 18/074,238

(22) Filed: Dec. 2, 2022

(65) Prior Publication Data
US 2023/0097720 A1    Mar. 30, 2023

Related U.S. Application Data

(63) Continuation of application No. 17/407,506, filed on Aug. 20, 2021, now Pat. No. 11,563,867.

(51) Int. Cl.
*H04N 1/04* (2006.01)
*H04N 1/00* (2006.01)
*H04N 1/409* (2006.01)

(52) U.S. Cl.
CPC ..... *H04N 1/00572* (2013.01); *H04N 1/00588* (2013.01); *H04N 1/00602* (2013.01); *H04N 1/00713* (2013.01); *H04N 1/00734* (2013.01); *H04N 1/00745* (2013.01); *H04N 1/4095* (2013.01); *H04N 2201/0094* (2013.01)

(58) Field of Classification Search
None
See application file for complete search history.

(56) References Cited

U.S. PATENT DOCUMENTS 11,563,867 B1 *  1/2023  Onuma ............... H04N 1/00572
2010/0072691 A1   3/2010  Ueda et al.

FOREIGN PATENT DOCUMENTS

| JP | 2005-129986 | 5/2005 |
| JP | 2011-023920 | 2/2011 |
| JP | 2011-171992 | 9/2011 |

OTHER PUBLICATIONS

Notice of Allowance on U.S. Appl. No. 17/407,506 Dtd Sep. 2, 2022.

* cited by examiner

*Primary Examiner* — Cheukfan Lee
(74) *Attorney, Agent, or Firm* — FOLEY & LARDNER LLP (57) ABSTRACT

An image reading device includes a tray, a paper feed roller that conveys a sheet, a first sensor that detects a front end and a rear end of the sheet, a second sensor that detects the front end of the sheet, and a scanner that reads an image on a front side of the sheet and reads an image on a back side of the sheet. A controller determines a first time duration that elapses from the detection of the front end of the sheet by the first sensor to the detection of the rear end of the sheet by the first sensor and operates the scanner to read the image on the back side of the sheet over a second time duration equal in length to the first time duration. The second time duration begins after the front end of the sheet is detected by the second sensor.

20 Claims, 4 Drawing Sheets

IMAGE READING DEVICE AND IMAGE READING METHOD

CROSS-REFERENCE TO RELATED APPLICATION

This application is a continuation of U.S. patent application Ser. No. 17/407,506, filed on Aug. 20, 2021, the entire contents of which are incorporated herein by reference.

FIELD

Embodiments described herein relate generally to an image reading device and an image reading method.

BACKGROUND

In the related art, when reading a sheet with an image reading device, the sheet is read according to the sheet size. However, when copying by specifying a magnification or reading a sheet of a size different from a standard size, the reading extends beyond the length of the sheet, such that a shadow at the rear end of the sheet is read and the image includes streaks. In order to remove these streaks, if the rear end of the sheet is detected by the image reading device, the streaks on the rear end of the sheet are removed by forcibly masking the image data to white from the front of the rear end portion to be read.

In the image reading device of the related art, the front end and the rear end of the sheet are detected by a sensor, the reading of the sheet is started by the detection of the front end, and the masking of the read image is started by the detection of the rear end. However, after the sheet passes through a front-side reading roller, the behavior of the rear end of the sheet becomes unstable, and the rear end of the sheet on the back side cannot be detected correctly. In this case, the rear end streaks could not be removed, or the image was removed in some cases.

DETAILED DESCRIPTION

In general, according to at least one embodiment, an image reading device includes a tray, a paper feed roller, a first sensor, a second sensor, a scanner, and a controller. The tray supports a sheet. The paper feed roller conveys the sheet away from the tray. The first sensor is positioned to detect the front end and the rear end of the sheet as the sheet is conveyed. The second sensor is positioned to detect the front end of the sheet as the sheet is conveyed. The scanner is configured to read an image on the front side of the sheet at a front-side reading position, and read an image on the back side of the sheet at a back-side reading position. The controller is configured to determine a first time duration that elapses from the detection of the front end of the sheet by the first sensor to the detection of the rear end of the sheet by the first sensor and operate the scanner to read the image on the back side of the sheet over a second time duration equal in length to the first time duration. The second time duration begins at a first point in time after the front end of the sheet is detected by the second sensor and ends at a second point in time.

Hereinafter, the image reading device and the image reading method of at least one embodiment will be described with reference to drawings.

Figure 1:
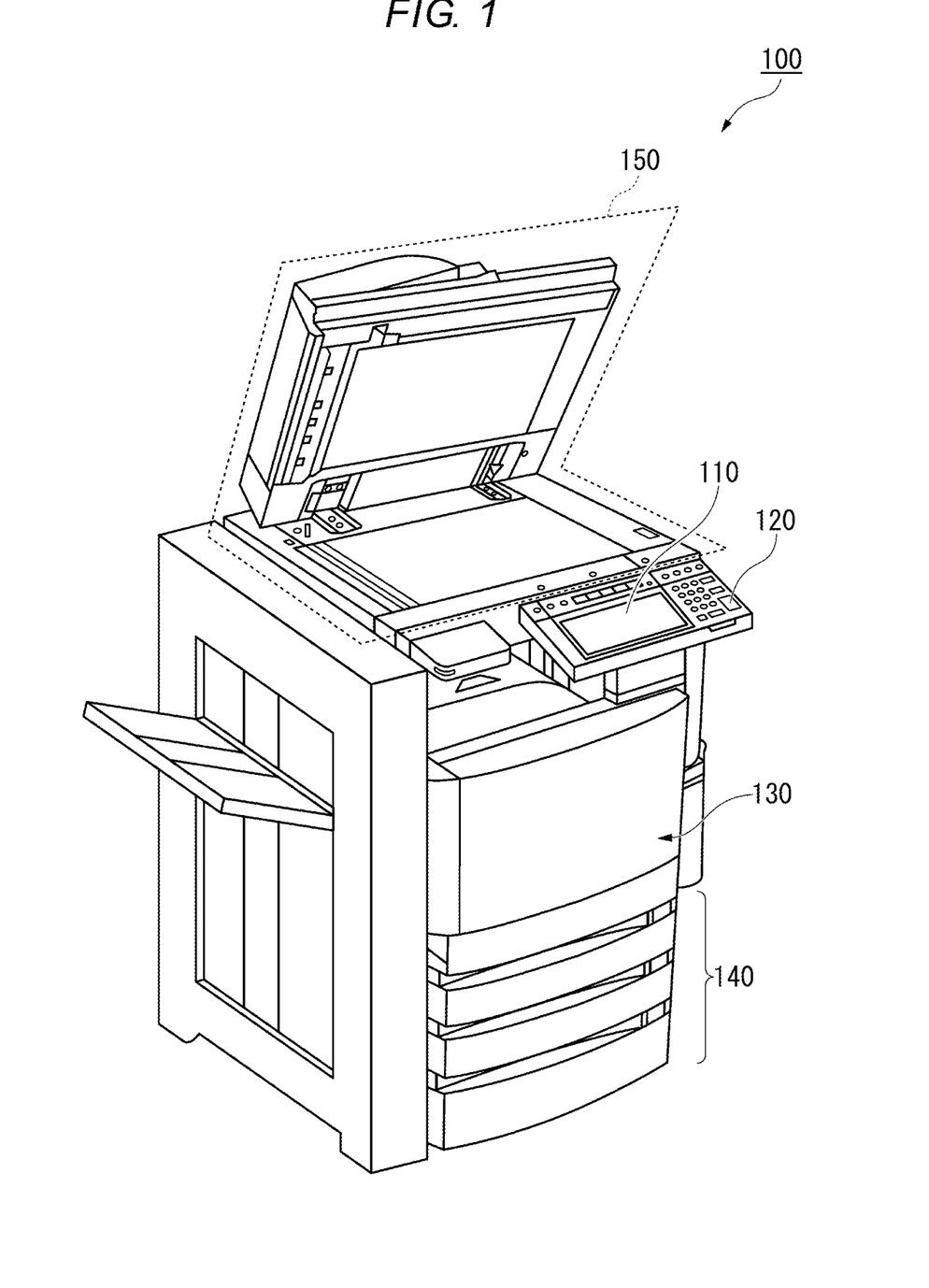
FIG. 1 is a perspective view illustrating an example of an overall configuration of an image forming apparatus of an embodiment.

FIG. 1 is a perspective view illustrating an example of an overall configuration of an image forming apparatus 100 of at least one embodiment. The image forming apparatus 100 of at least one embodiment is a multifunction peripheral (MFP) capable of forming a toner image on a sheet. The sheet is, for example, paper on which characters or images are formed. The sheet may be any material as long as the image forming apparatus 100 can form an image thereon. The image forming apparatus 100 reads an image appearing on a sheet, generates digital data, and generates image information.

The image forming apparatus 100 executes printing by image forming processing and image fixing processing. The image forming processing is processing of forming an image on a sheet. The image fixing processing is processing of fixing an image formed on a sheet on the sheet. The image forming apparatus 100 is an aspect of the image reading apparatus.

The image forming apparatus 100 includes a display 110, a control panel 120, a printer unit 130, a sheet accommodating unit 140, and an image reading device 150. The display 110 (e.g., an output device) is an image display device such as a liquid crystal display, an organic electro luminescence (EL) display, or the like. The display 110 displays various information related to the image forming apparatus 100. The display 110 outputs a signal corresponding to the operation performed by a user to the control unit of the image forming apparatus 100. In the following description, the control unit of the image forming apparatus 100 is a control unit different from the control unit included in the image reading device 150. The display 110 accepts user operations (e.g., acts as an input device).

The control panel 120 includes an operation unit. The operation unit includes a plurality of buttons and the like. The operation unit receives a user operation (e.g., acts as an input device). For example, the operation unit receives a print instruction and an instruction for enabling or disabling mask processing. The mask processing is processing of converting at least a part of image data into a white image. The operation unit outputs a signal corresponding to the operation performed by the user to the internal control unit. The display 110 and the control panel 120 may be configured as an integral touch panel (e.g., the display 110 and the control panel 120 may act as a user interface or an operator interface).

The printer unit 130 (e.g., a printer) executes image forming processing and image fixing processing. Specifically, the printer unit 130 forms an image on a sheet based on the image information generated by the image reading device 150 or the image information received via a communication path. For example, the printer unit 130 forms a toner image on a sheet whose front end is aligned by a registration roller 40. The printer unit 130 heats and pressurizes the sheet to fix an image (for example, a toner image) formed on the sheet.

The sheet accommodating unit 140 (e.g., a sheet feeder) includes a single or a plurality of paper feed cassettes. Each of the paper feed cassettes stores a predetermined size and a predetermined type of sheet. The predetermined type of sheet is a sheet having a different thickness. For example, the predetermined type of sheet includes plain paper, thick paper, and the like.

The image reading device 150 (e.g., a scanner) reads the image information to be read as light brightness. For example, the image reading device 150 reads the image information printed on the sheet to be read set in the own device. For example, the image reading device 150 reads the image information on the front side printed on the sheet and the image information on the back side. The image reading device 150 records the read image information on the front side and the image information on the back side. The recorded image information may be transmitted to another information processing apparatus via a network (e.g., a local area network, the Internet, etc.). The recorded image information may be formed on the sheet by the printer unit 130. The image reading device 150 is, for example, an auto document feeder (ADF).

Figure 2:
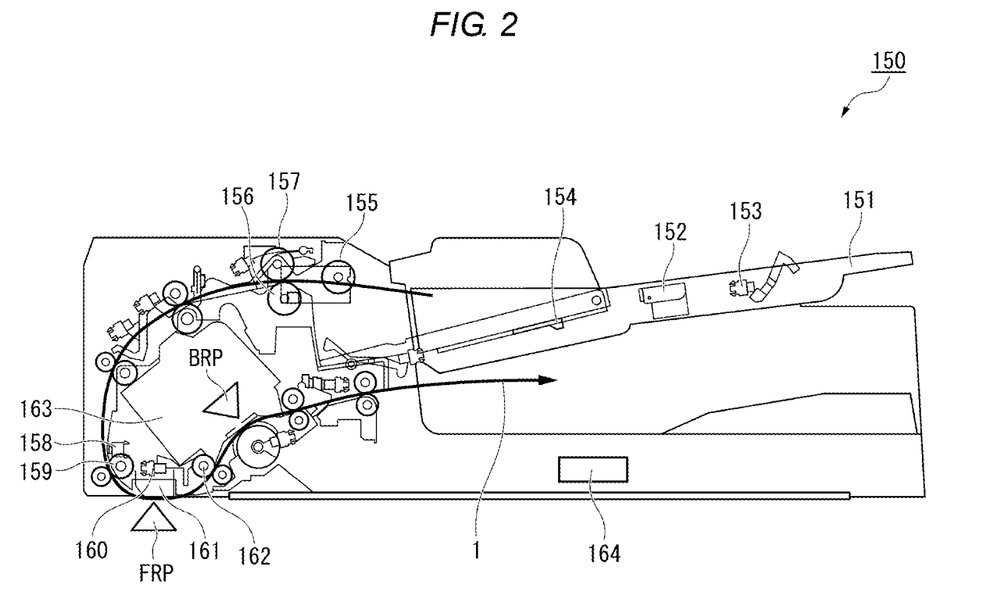
FIG. 2 is a side section view illustrating an internal configuration of an image reading device.

FIG. 2 is a side section view illustrating an internal configuration of the image reading device 150 of at least one embodiment. FIG. 2 illustrates only the configuration necessary for illustrating the processing of the image reading device 150 in the present embodiment.

The image reading device 150 includes a mounting unit 151, a sheet length sensor 152, a sheet length sensor 153, a sheet width sensor 154, a pickup roller 155, a separation roller 156, a paper feed roller 157, a front-side reading start sensor 158, a roller 159, a back-side reading start sensor 160, a front-side image reading unit 161, a roller 162, a back-side image reading unit 163, and a control unit 164. In FIG. 2, the arrow 1 indicates the direction in which a sheet is conveyed.

The mounting unit 151 (e.g., a sheet support) is a tray on which a sheet is mounted. The sheet length sensor 152 detects the sheet mounted on the mounting unit 151. The sheet length sensor 153 detects the sheet mounted on the mounting unit 151. The sheet length sensors 152 and 153 are used to detect the length of the sheet mounted on the mounting unit 151. The sheet width sensor 154 detects the sheet mounted on the mounting unit 151. The sheet width sensor 154 is used to detect the width of the sheet mounted on the mounting unit 151. The size of the sheet mounted on the mounting unit 151 is determined by the detection results of the sheet length sensors 152 and 153, and the sheet width sensor 154.

The pickup roller 155 picks up the sheets mounted on the mounting unit 151 one by one (e.g., individually).

The separation roller 156 is a roller for separating the sheets in order to convey the sheets mounted on the mounting unit 151 one by one. The paper feed roller 157 feeds the sheet mounted on the mounting unit 151. The separation roller 156 and the paper feed roller 157 rotate in opposite directions. The paper feed roller 157 feeds the sheet picked up by the pickup roller 155 to the downstream side. The downstream side is the direction in which the sheet is conveyed (for example, the direction indicated by the arrow 1).

The front-side reading start sensor 158 is provided on the downstream side of the paper feed roller 157. The front-side reading start sensor 158 detects the sheet fed by the paper feed roller 157. For example, the front-side reading start sensor 158 detects the front end and the rear end of the sheet fed by the paper feed roller 157. The front-side reading start sensor 158 is provided to detect the sheet before the front side of the sheet is read. The front-side reading start sensor 158 is an optical sensor. By way of example, the front-side reading start sensor 158 may include a break beam sensor that activates in response to an object (e.g., the sheet) interrupting a beam of light. The front-side reading start sensor 158 is one aspect of the first sensor. The front-side reading start sensor 158 notifies the control unit 164 of the detection result.

The roller 159 is provided on the downstream side of the front-side reading start sensor 158 and on the upstream side of a front-side reading position FRP. The roller 159 sends the sheet that has passed through the front-side reading start sensor 158 to the front-side reading position FRP.

The back-side reading start sensor 160 is provided on the downstream side of the front-side reading start sensor 158. The back-side reading start sensor 160 detects the sheet conveyed by the roller 159. For example, the back-side reading start sensor 160 detects the front end of the sheet that has passed through the front-side reading start sensor 158. The back-side reading start sensor 160 is provided to detect the sheet before the back side of the sheet is read. The back-side reading start sensor 160 is a sensor with an actuator. More specifically, the back-side reading start sensor 160 is a sensor capable of detecting the sheet in response to the sheet contacting and driving movement of a movable portion of the actuator. It is difficult to install an optical sensor in the place where the back-side reading start sensor 160 is installed due to the size problem (e.g., an optical sensor is difficult to package between the roller 159 and the roller 162 due to size constraints). Therefore, instead of the optical sensor, a sensor with an actuator is used for the back-side reading start sensor 160. The back-side reading start sensor 160 is one aspect of the second sensor. The back-side reading start sensor 160 notifies the control unit 164 of the detection result.

The front-side image reading unit 161 reads an image on the front side of the sheet.

The roller 162 is provided on the downstream side of the back-side reading start sensor 160 and on the upstream side of a back-side reading position BRP. The roller 162 conveys the sheet that has passed through the back-side reading start sensor 160 to the back-side reading position BRP.

The back-side image reading unit 163 reads the image on the back side of the sheet (e.g., a side of the sheet opposite the front side).

The control unit 164 (e.g., a controller) controls the operation of the image reading device 150. Here, an example of the processing of the control unit 164 will be described. If the control unit 164 detects that the sheet is placed on the mounting unit 151 (e.g., by an original presence and absence sensor), the control unit 164 notifies the control unit provided in the image forming apparatus 100 that there is a sheet. The control unit 164 controls the drive of each roller (for example, pickup roller 155, separation roller 156, paper feed roller 157, roller 159, roller 162, and the like) included in the image reading device 150. By way of example, the control unit 164 may activate, vary the speed of, or deactivate one or more actuators (e.g., electric motors) that drive each roller.

The control unit 164 performs control according to the detection result of the front-side reading start sensor 158 or the back-side reading start sensor 160. The control unit 164 has a front-side reading start timer, a front-side reading end timer, a sheet length measurement timer, and a back-side reading start timer. The front-side reading start timer, the front-side reading end timer, the sheet length measurement timer, and the back-side reading start timer are timers realized by software (e.g., within the control unit 164).

The front-side reading start timer is a timer of which a reference time for starting the reading of the front side of the sheet is set. The time in the front-side reading start timer is set as the conveyance time calculated based on the conveyance distance from the position where the front-side reading start sensor 158 is activated or turned on (e.g., in response to the sheet passing near the front-side reading start sensor) to the front-side reading position FRP and the conveyance speed of the sheet. Hereinafter, the conveyance distance from the position where the front-side reading start sensor 158 is turned on to the front-side reading position FRP is referred to as a first conveyance distance. The conveyance time calculated based on the first conveyance distance is described as a first conveyance time.

When the time set in the front-side reading start timer has elapsed, the control unit 164 notifies the control unit of the image forming apparatus 100 of an instruction (hereinafter, referred to as "front-side reading signal") to turn on a front-side sub-scanned image enabled signal in order to start reading the front side of the sheet. The front-side sub-scanned image enabled signal is a signal for starting to read an image in the sub-scan direction of the front side of the sheet. Turning on the front-side sub-scanned image enabled signal means starting to read the image in the sub-scan direction.

The front-side reading end timer is a timer of which a reference time for ending the reading of the front side of the sheet is set. The time in the front-side reading end timer is set as the conveyance time calculated based on the distance obtained by subtracting the value of the cut mount of the rear end streaks, which is obtained in advance, from the first conveyance distance. The cut amount is adjustable.

The control unit 164 sets to mask the image data on the front side when the time set in the front-side reading end timer elapses. For example, the control unit 164 performs mask processing on the image data after the lapse of time set in the front-side reading end timer.

The sheet length measurement timer is a timer for measuring the length of the sheet. The sheet length measurement timer starts counting at the timing (i.e., the point in time) when the front end of the sheet is detected by the front-side reading start sensor 158, and stops counting at the timing when the rear end of the sheet is detected by the front-side reading start sensor 158. The length of the sheet can be measured based on the time from the timing when the front end of the sheet is detected by the front-side reading start sensor 158 to the detection of the rear end of the sheet.

The back-side reading start timer is a timer of which a reference time for starting the reading of the back side of the sheet is set. The time in the back-side reading start timer is set as the conveyance time calculated based on the conveyance distance from the position where the back-side reading start sensor 160 is turned on to the back-side reading position BRP and the conveyance speed of the sheet. Hereinafter, the conveyance distance from the position where the back-side reading start sensor 160 is turned on to the back-side reading position BRP is referred to as a second conveyance distance. The conveyance time calculated based on the second conveyance distance is described as a second conveyance time.

When the time set in the back-side reading start timer has elapsed, the control unit 164 notifies the control unit of the image forming apparatus 100 of an instruction (hereinafter, referred to as "back-side reading signal") to turn on a back-side sub-scanned image enabled signal in order to start reading the back side of the sheet. The back-side sub-scanned image enabled signal is a signal for starting to read an image in the sub-scan direction of the back side of the sheet. Turning on the back-side sub-scanned image enabled signal means starting to read the image in the sub-scan direction.

The control unit 164 notifies the control unit of the image forming apparatus 100 of the sheet size when the scan is started. The control unit 164 acquires magnification information, the number of reading lines, double-sided reading information, and information regarding the presence or absence of the rear end streak cut from the control unit of the image forming apparatus 100. The magnification information is information indicating the magnification when printing the sheet. The number of reading lines indicates the number of read lines on the sheet. The double-sided reading information is information indicating an instruction for double-sided reading. The information regarding the presence or absence of the rear end streak cut is information indicating whether the mask processing is enabled or disabled. If the rear end streak cut is enabled, it indicates that the mask processing is enabled. If the rear end streak cut is disabled, it indicates that the mask processing is disabled.

Figure 3:
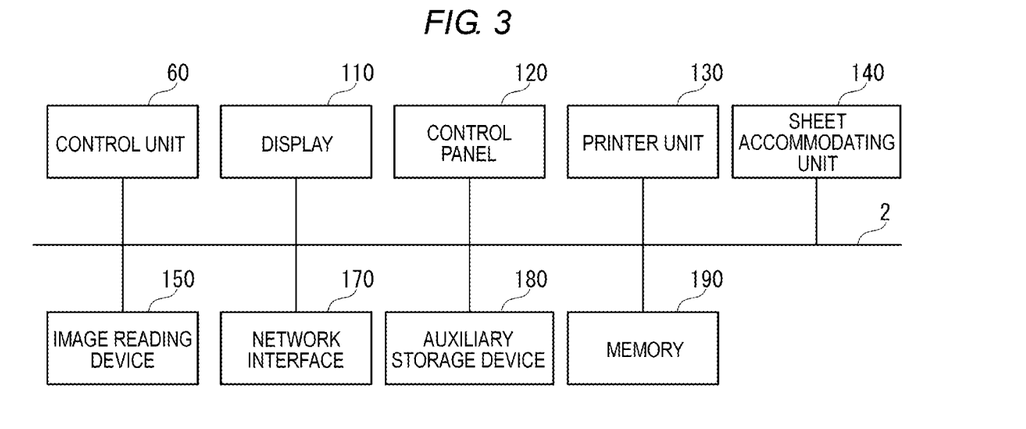
FIG. 3 is a block diagram illustrating a functional configuration of the image forming apparatus.

FIG. 3 is a block diagram illustrating a functional configuration of the image forming apparatus 100 of at least one embodiment. FIG. 3 illustrates a part of the hardware configuration. The image forming apparatus 100 includes a control unit 60 (e.g., a controller), the display 110, the control panel 120, a printer unit 130, the sheet accommodating unit 140, the image reading device 150, a network interface 170, an auxiliary storage device 180, and a memory 190. Each functional unit is connected so that data communication is possible via a system bus 2.

The display 110, the control panel 120, the printer unit 130, the sheet accommodating unit 140, and the image reading device 150 are the same as those described above, and thus the description thereof will be omitted. Hereinafter, the control unit 60, the network interface 170, the auxiliary storage device 180, and the memory 190 will be described.

The control unit 60 is a processor such as a central processing unit (CPU) or a graphics processing unit (GPU). The control unit 60 controls the operation of each functional unit of the image forming apparatus 100. The control unit 60 executes various processing by loading the program stored in the read only memory (ROM) into the random access memory (RAM) and executing the program. An application specific integrated circuit (ASIC) may have an appropriate function realized by the control unit 60. The ASIC is a dedicated circuit for realizing a specific function.

Here, an example of the processing of the control unit 60 will be described. If the control unit 164 provided in the image reading device 150 notifies that there is a sheet, the control unit 60 instructs the control unit 164 to start scanning. The control unit 60 notifies the control unit 164 of the magnification information, the number of reading lines, the double-sided reading information, the information regarding the presence and absence of the rear end streak cut, and the information on the cut amount input from the control panel 120 (e.g., by a user) or the like.

The control unit 60 includes a front-side image reading timer and a back-side image reading timer. The front-side image reading timer and the back-side image reading timer are timers realized by software. The front-side image reading timer is a timer that measures the time during which the image on the front side of the sheet is being read. The control unit 60 starts the front-side image reading timer at the timing when a front-side reading signal is obtained. The control unit 60 turns off the front-side sub-scanned image enabled signal at the timing when the time indicated by the front-side image reading timer elapses the time corresponding to the number of reading lines.

The back-side image reading timer is a timer that measures the time during which the image on the back side of the sheet is being read. The control unit 60 starts the back-side image reading timer at the timing when a back-side reading signal is obtained. The control unit 60 turns off the back-side sub-scanned image enabled signal at the timing when the time indicated by the back-side image reading timer elapses the time corresponding to the number of reading lines.

The network interface 170 sends and receives data to and from other devices. The network interface 170 operates as an input interface and receives data transmitted from other devices. The network interface 170 operates as an output interface and transmits data to other devices.

The auxiliary storage device 180 is, for example, a hard disk or a solid state drive (SSD) and stores various data. The various data are, for example, digital data, jobs, job logs, and the like. The digital data is digital data of image information generated by the image reading device 150.

The memory 190 is, for example, a random access memory (RAM). The memory 190 temporarily stores data used by each functional unit of the image forming apparatus 100. The memory 190 may store digital data generated by the image reading device 150. The memory 190 may temporarily store jobs and job logs.

Figure 4:
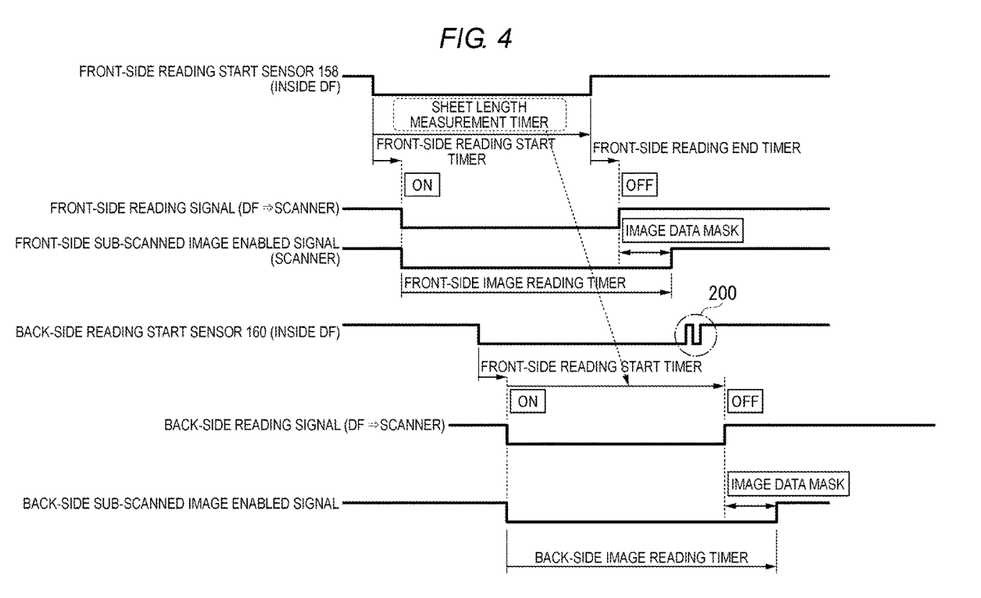
FIG. 4 is a timing chart illustrating a processing flow of the image forming apparatus.

FIG. 4 is a timing chart (e.g., a timeline) illustrating the processing flow of the image forming apparatus 100 in at least one embodiment. The control unit 164 included in the image reading device 150 controls each roller such as the pickup roller 155 according to the instruction to start scanning, and conveys the sheet mounted on the mounting unit 151. The sheet conveyed to each roller is detected by the front-side reading start sensor 158. For example, the front-side reading start sensor 158 detects the front end of the conveyed sheet.

At the timing when the front end of the sheet reaches the front-side reading start sensor 158, the control unit 164 starts the front-side reading start timer and the sheet length measurement timer. When the front-side reading start timer reaches the first conveyance time, the control unit 164 notifies the control unit 60 of the image forming apparatus 100 of the front-side reading signal.

Upon receiving the front-side reading signal, the control unit 60 of the image forming apparatus 100 turns on the front-side sub-scanned image enabled signal and starts the front-side image reading timer. As a result, the image in the sub-scan direction of the front side of the sheet is read from the timing when the front-side sub-scanned image enabled signal is turned on. It is assumed that the sheet passes through the front-side reading position FRP and the front end of the sheet is detected by the back-side reading start sensor 160.

At the timing when the front end of the sheet reaches the back-side reading start sensor 160, the control unit 164 starts the back-side reading start timer. When the back-side reading start timer reaches the second conveyance time, the control unit 164 notifies the control unit 60 of the image forming apparatus 100 of the back-side reading signal. The waveform in the dotted circle 200 illustrated in FIG. 4 illustrates the influence on the sensor output due to the fluttering of the rear end of the back side of the sheet.

The control unit 60 of the image forming apparatus 100 turns on the back-side sub-scanned image enabled signal and starts the back-side image reading timer in response to the reception of the back-side reading signal. As a result, the image in the sub-scan direction of the back side of the sheet is read from the timing when the back-side sub-scanned image enabled signal is turned on.

At the timing when the rear end of the sheet passes through the front-side reading start sensor 158, the control unit 164 starts the front-side reading end timer and stops the sheet length measurement timer.

When the front-side reading end timer reaches the conveyance time calculated based on the distance obtained by subtracting the value of the cut amount of the rear end streaks, which is obtained in advance, from the first conveyance distance, the control unit 164 sets to mask the image data on the front side. As a result, the image data after the front-side reading end timer reaches the conveyance time calculated based on the distance obtained by subtracting the value of the cut amount of the rear end streaks, which is obtained in advance, from the first conveyance distance is subject to mask processing. For example, the control unit 60 masks the image data on the front side from the timing when the setting for masking the image data on the front side is made. When the front-side image reading timer has elapsed a time corresponding to the number of reading lines, the control unit 60 turns off the front-side sub-scanned image enabled signal.

When the back-side image reading timer reaches a value obtained by subtracting the time corresponding to the cut amount of the rear end streaks from the value indicated by the sheet length measurement timer obtained by the measurement of the front side, the control unit 60 performs mask processing on the image data on the back surface. As a result, the image data after the back-side image reading timer reaches the value obtained by subtracting the time corresponding to the cut amount of the rear end streaks from the value indicated by the sheet length measurement timer obtained by the measurement of the front side is subject to mask processing. When the back-side image reading timer has elapsed a time corresponding to the number of reading lines, which is notified by the control unit 60, the control unit 164 instructs the control unit 60 to turn off the back-side sub-scanned image enabled signal. The control unit 60 turns off the back-side sub-scanned image enabled signal.

According to the image forming apparatus 100 configured as described above, it is possible to stably read both sides of the sheet. Specifically, the image forming apparatus 100 performs mask processing on the rear end of the back-side sheet at the timing when the on-time of the front-side reading start sensor 158 elapses from the timing when the back-side reading start sensor 160 detects the sheet. That is, the image forming apparatus 100 stops reading the image on the back side of the sheet at the timing when the on-time of the front-side reading start sensor 158 elapses from the timing when the back-side reading start sensor 160 detects the sheet. As a result, the influence on the sensor due to the fluttering of the rear end of the sheet can be reduced, and the sheet can be read by the same length on both the front side and the back side. Therefore, both sides of the sheet can be read stably.

The image forming apparatus 100 receives an instruction input for enabling or disabling the mask processing via a control panel or the like. This makes it possible to change whether or not to execute the mask processing in response to the user's request.

A modified example of the image forming apparatus 100 will be described. In the above description, the image forming apparatus 100 that executes printing by the image forming processing and the image fixing processing has been described as an example. The above-mentioned processing may be applied to the image reading device that reads an image without the image forming apparatus 100 performing an image forming processing and an image fixing processing. In this case, the image reading device is provided with the control unit 164. The control unit 164 performs both the processing of the control unit 164 described above and the processing of the control unit 60.

A computer may realize some functions of the image forming apparatus 100 in the above-described embodiment. In that case, a program for realizing these functions is recorded on a computer-readable recording medium. Then, the functions may be realized by causing a computer system to read and execute a program recorded on a recording medium in which the above-described program is recorded. The "computer system" referred to here includes hardware such as an operating system and peripheral equipment. "Computer-readable recording medium" refers to a portable medium, a storage device, or the like. The portable medium is a flexible disk, magneto-optical disk, ROM, CD-ROM, or the like. The storage device is a hard disk built in the computer system or the like.

Further, the "computer-readable recording medium" dynamically holds a program for a short time, such as a communication line for transmitting a program via a communication line. The communication line is a network such as the Internet, a telephone line, or the like. The "computer-readable recording medium" may be a volatile memory inside a computer system serving as a server or a client. The volatile memory holds a program for a certain period of time. The above-described program may be for realizing a part of the above-described functions. The above-described program may be realized by combining the above-described functions with a program already recorded in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of at least one embodiments described herein may be made without departing from the spirit of the inventions. The accompanying claims and their equivalents are intended to cover such forms or modifications as would fall within the scope and spirit of the inventions.

What is claimed is:

1. An image reading device comprising:
    a tray configured to support a sheet;
    a paper feed roller positioned to convey the sheet away from the tray;
    a first sensor positioned to detect a front end and a rear end of the sheet as the sheet is conveyed;
    a second sensor positioned to detect the front end of the sheet as the sheet is conveyed;
    a scanner configured to read an image on a front side of the sheet at a front-side reading position and configured to read an image on a back side of the sheet at a back-side reading position; and
    a controller configured to:
        determine a first time duration that elapses from the detection of the front end of the sheet by the first sensor to the detection of the rear end of the sheet by the first sensor; and
        commence mask processing on the image on the back side of the sheet after the front end of the sheet is detected by the second sensor.

2. The image reading device of claim 1, wherein a second time duration elapses between when the front end of the sheet is detected by the second sensor and when the controller commences the mask processing, the second time duration being at least as long as the first time duration.

3. The image reading device of claim 1, wherein the controller is configured to:
    operate the scanner to read the image on the back side of the sheet over a second time duration equal in length to the first time duration, the second time duration beginning at a first point in time after the front end of the sheet is detected by the second sensor and ending at a second point in time; and
    commence the mask processing at the second point in time.

4. The image reading device of claim 3, wherein the controller is configured to:
    receive a number of reading lines prior to reading the image on the front side of the sheet and prior to reading the image on the back side of the sheet;
    end reading of the image on the front side of the sheet in response to the scanner having read the image on the front side of the sheet for a first threshold length of time, the first threshold length of time corresponding to the number of reading lines; and
    end reading of the image on the back side of the sheet in response to the scanner having read the image on the back side of the sheet for a second threshold length of time, the second threshold length of time corresponding to the number of reading lines.

5. The image reading device of claim 4, wherein the first threshold length of time is equivalent to the second threshold length of time.

6. The image reading device of claim 1, further comprising:
    a control panel configured to accept an instruction input for enabling or disabling the mask processing, wherein the controller is configured to perform the mask processing in response to an indication that the mask processing is enabled.

7. The image reading device of claim 1, wherein the controller is configured to:
    start a front-side reading end timer when the rear end of the sheet is detected by the first sensor;
    end reading of the image on the front side of the sheet based on the front-side reading end timer;
    calculate a conveyance time based on a distance obtained by subtracting (a) a cut amount of the sheet from (b) a conveyance distance from the first sensor to the front-side reading position; and
    commence processing on the image on the front side of the sheet when the front-side reading end timer reaches the conveyance time.

8. The image reading device of claim 1, wherein the controller is configured to:
    start a sheet length measurement timer when the front end of the sheet is detected by the first sensor;
    stop the sheet length measurement timer when the rear end of the sheet is detected by the first sensor; and
    determine a length of the sheet based on a value of the sheet length measurement timer.

9. The image reading device of claim 1, wherein
    the first sensor is an optical sensor, and
    the second sensor includes a movable portion.

10. The image reading device of claim 1, further comprising:

a first roller that is provided between the first sensor and the front-side reading position and configured to convey the sheet downstream; and a second roller that is provided between the second sensor and the back-side reading position and configured to convey the sheet downstream.

11. An image reading method comprising:

supporting, by a tray, a sheet;

conveying, by a paper feed roller, the sheet away from the tray;

detecting, by a first sensor, a front end and a rear end of the sheet as the sheet is conveyed;

detecting, by a second sensor, the front end of the sheet;

determining a first time duration that elapses from the detection of the front end of the sheet by the first sensor to the detection of the rear end of the sheet by the first sensor;

reading, by a scanner, an image on the front side of the sheet at a front-side reading position; and performing, by a controller, mask processing on the image on the back side of the sheet at a second point in time, a second time duration beginning at a first point in time after the front end of the sheet is detected by the second sensor and ending at the second point in time, and the second time duration being equal in length to the first time duration.

12. The image reading method of claim 11, further comprising:

reading, by the scanner, an image on the back side of the sheet at a back-side reading position over the second time duration.

13. The image reading method of claim 12, further comprising:

acquiring a number of reading lines prior to reading the image on front side of the sheet and prior to reading the image on the back side of the sheet;

ending reading of the image on the front side of the sheet in response to the scanner having read the image on the front side of the sheet for a first threshold length of time, the first threshold length of time corresponding to the number of reading lines; and ending reading of the image on the back side of the sheet in response to the scanner having read the image on the back side of the sheet for a second threshold length of time, the second threshold length of time corresponding to the number of reading lines.

14. The image reading method of claim 12, further comprising:

conveying, by a first roller, the sheet downstream, the first roller being provided between the first sensor and the front-side reading position; and conveying, by a second roller, the sheet downstream, the second roller being provided between the second sensor and the back-side reading position.

15. The image reading method of claim 11, further comprising:

receiving, by a control panel, an instruction to enable or disable the mask processing; and performing the mask processing in response to the instruction enabling the mask processing.

16. The image reading method of claim 11, further comprising:

starting, by the controller, a front-side reading end timer when the rear end of the sheet is detected by the first sensor;

ending reading of the image on the front side of the sheet based on the front-side reading end timer;

calculating, by the controller, a conveyance time based on a distance obtained by subtracting (a) a cut amount of the sheet from (b) a conveyance distance from the first sensor to the front-side reading position; and performing, by the controller, mask processing on the image on the front side of the sheet when the front-side reading end timer reaches the conveyance time.

17. The image reading method of claim 11, further comprising:

starting, by the controller, a sheet length measurement timer when the front end of the sheet is detected by the first sensor;

stopping, by the controller, the sheet length measurement timer when the rear end of the sheet is detected by the first sensor; and determining, by the controller, a length of the sheet based on a value of the sheet length measurement timer.

18. The image reading method of claim 11, wherein the first sensor is an optical sensor, and the second sensor includes a movable portion.

19. The image reading method of claim 18, wherein the second sensor detects the sheet in response to the sheet contacting the movable portion and driving movement of the movable portion.

20. An image reading device comprising:

a tray configured to support a sheet;

a paper feed roller positioned to convey the sheet away from the tray;

a sensor positioned to detect a front end and a rear end of the sheet as the sheet is conveyed;

a scanner configured to read an image on a front side of the sheet at a front-side reading position and configured to read an image on a back side of the sheet at a back-side reading position; and a controller configured to:

start a sheet length measurement timer when the front end of the sheet is detected by the sensor;

stop the sheet length measurement timer when the rear end of the sheet is detected by the sensor;

determine a length of the sheet based on a value of the sheet length measurement timer; and commence mask processing on the image on the back side of the sheet based on the determined length of the sheet.

* * * * *